R. WALKER.
DRIVING AND BRAKING MECHANISM FOR CYCLES AND THE LIKE.
APPLICATION FILED NOV. 20, 1907.

1,000,353.

Patented Aug. 8, 1911.

2 SHEETS—SHEET 1.

INVENTOR,
ROBERT WALKER,
by
vanOldenneel Schoenlank
Attorneys.

WITNESSES:

R. WALKER.
DRIVING AND BRAKING MECHANISM FOR CYCLES AND THE LIKE.
APPLICATION FILED NOV. 20, 1907.
1,000,353.
Patented Aug. 8, 1911.
2 SHEETS—SHEET 2.
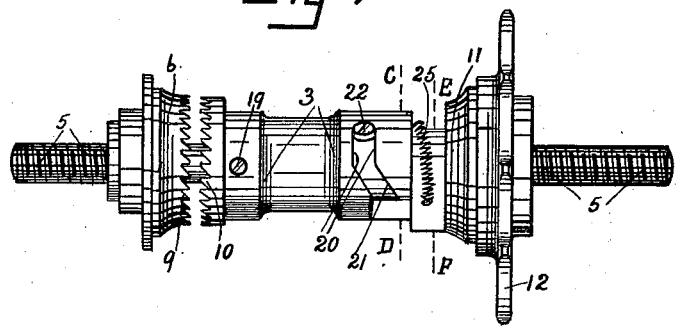
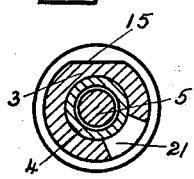
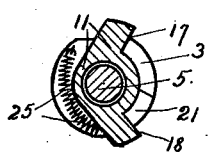
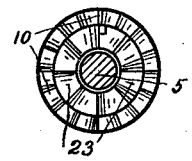
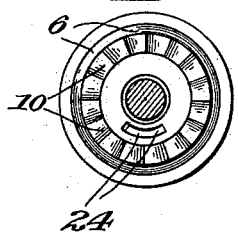
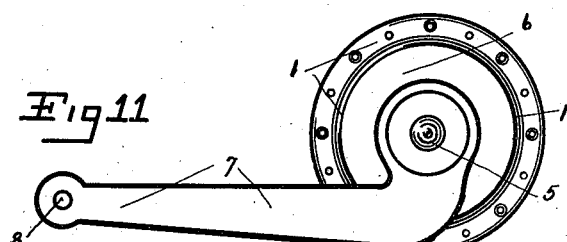
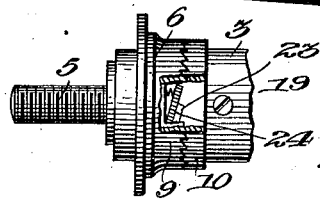
WITNESSES;
INVENTOR,
ROBERT WALKER,
by
Attorneys.
COLUMBIA PLANOGRAPH CO., WASHINGTON, D. C.

UNITED STATES PATENT OFFICE.

ROBERT WALKER, OF PLYMOUTH, ENGLAND.

DRIVING AND BRAKING MECHANISM FOR CYCLES AND THE LIKE.

1,000,353.   Specification of Letters Patent.   Patented Aug. 8, 1911.

Application filed November 20, 1907. Serial No. 403,015.

*To all whom it may concern:*

Be it known that I, ROBERT WALKER, of Sawrey street, Plymouth, in the county of Devon, England, manufacturer, have invented certain new and useful Improvements in Driving and Braking Mechanism for Cycles and the Like; and I do hereby declare that the following is a full, clear, and exact description of the same.

My invention comprises improved mechanism arranged within the hub wheel of cycles, motor cars, or the like, whereby said wheel may be braked.

The object of my invention is to provide a better and more efficient device for this purpose than those heretofore employed.

My invention consists in the employment of mechanism located within the wheel hub and comprising an expansible split cylinder and a longitudinally disposed lever for opening said cylinder to apply a braking pressure.

Figure 1:
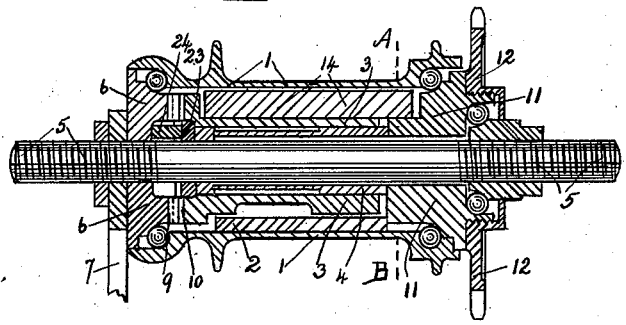
Figure 2:
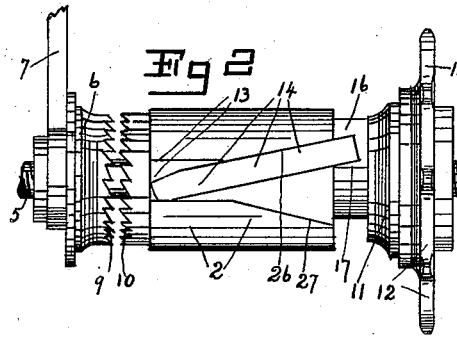
Figure 3:
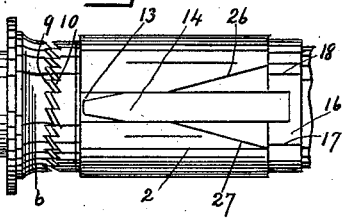
Figure 4:
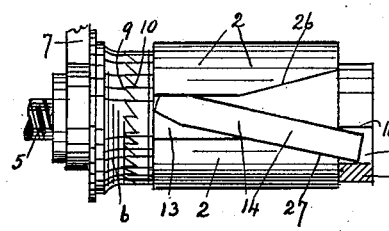
Figure 5:
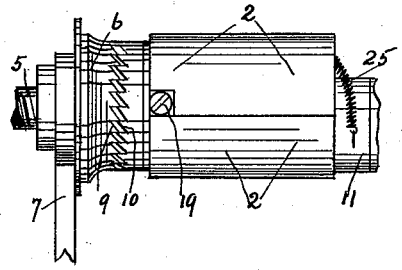
Figure 6:
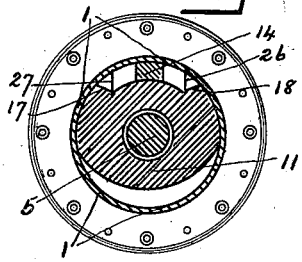

Referring to the drawings. Figure 1 is a longitudinal section of a rear hub fitted with driving and braking, free wheeling mechanism according to my invention. Fig. 2 shows the mechanism in its driving position, the hub shell being removed. Fig. 3 is a similar view to Fig. 2 with the mechanism in its free wheeling position. Fig. 4 is again a similar view but with the mechanism in its braking position. Fig. 5 is another view of the mechanism in its free wheeling position. Fig. 6 is a transverse section at A—B in Fig. 1. Fig. 7 shows the clutch control mechanism with the cylinder and hub shell removed. Fig. 8 is a section at C—D in Fig. 7. Fig. 9 is a transverse section at E—F in Fig. 7. Fig. 10 shows the ratchet clutch rings on the end of the sliding control sleeve. Fig. 11 is a left hand elevation of the hub complete. Figs. 12 and 13 are respectively, end and side views of a portion of a bicycle hub, showing a supplemental clutch.

In constructing a cycle hub provided with driving, free wheeling and braking mechanism, according to my invention, as illustrated upon the accompanying drawings, within the hub shell, 1, I mount an expansible split cylinder 2, which is preferably divided longitudinally into two parts, as shown. This cylinder 2 is located around the clutch control sleeve 3, which is slidably mounted upon the sleeve 4, in turn rotatably supported upon the spindle 5. At one end of the hub is a cone 6, to which is secured an arm 7, both fixed upon the spindle. This arm 7 is designed to be anchored to the chain stays at 8. Upon the inner face of the cone 6, is a clutch 9 adapted to engage a corresponding clutch 10, carried by the aforementioned sliding clutch control sleeve, 3. At the opposite end of the hub, is another cone 11, to which is secured a plain sprocket wheel 12, this cone being adapted to freely rotate around the spindle, and the inner face of said cone being secured to the aforementioned sleeve 4. The cylinder 2 has a slot or space, 13, in which a control lever 14 is located resting on a flat surface 15 (Fig. 8) on sleeve 3, the right hand end of said lever lying within a notch 16 between shoulders 17 and 18 (Figs. 2, 3, 4 and 9) on the aforementioned cone 11, whereby the cylinder may be controlled in manner hereinafter explained. A screw or stop, 19, is provided near one end of the cylinder to retain it in its normal position relatively to the sleeve 3.

Within the clutch sleeve 3 is a transverse slot 20 having (Fig. 7) an inclined portion 21, a screw or peg 22 fixed in the sleeve 4 projecting into said slot. When the cone 11 and sleeve 4 are rotated backwardly, the sleeve 3 is moved endwise, bringing the clutch 10 into engagement with the clutch 9, while—when driving forwardly—the clutch is disengaged, and, with its sleeve, moved into the position shown by Fig. 7. A supplemental ratchet clutch 23 (Fig. 10) is located in the end of the control sleeve and is engaged by a spring pawl 24, this clutch serving to bring the main clutch and brake more quickly into action on back pedaling as the pawl prevents all backward movement of the sleeve 3. A spring 25 is located between the cone and control sleeve to keep the lever normally just ready to expand the cylinder for driving. When driving the sprocket 12 cone 11 and sleeve 4 are rotated, the peg 22 moving in the slot 20, 21 and withdrawing the clutch 10 from clutch 9 to the position shown by Figs. 2 and 7. The shoulder 17 engages the lever 14 which is shifted into engagement with the inclined edge 26 of the cylinder which, being fixed against rotation relatively to the cone 11, is forced to expand and thus engage the interior of the hub shell. Obviously when the cylinder engages the hub shell, the latter is caused to rotate therewith, thus providing a driving connection.

In free wheeling, the clutches 9 and 10 partially disengage, while the lever 14 takes up a central position with the cylinder in its contracted condition as shown by Figs. 3 and 5. The hub shell and wheel may then overrun in the well known manner.

Braking is obtained by back pedaling. The sprocket 12 cone 11 and sleeve 4 are rotated in the reverse direction the peg 22 moving in the slot 20 to the inclined part 21 thus moving the sleeve 3 endwise and forcing the clutch 10 into engagement with the clutch 9, when backward movement of said parts is stopped. The shoulder 18 then engages the lever 14 which is shifted into engagement with the incline 27 thus expanding the cylinder to give a braking effect within the hub.

In an application, Serial Number 463,918, filed November 21, 1908, as a division of this application, I have shown my improvements embodied in hand-applied brakes.

If desired a liner of hardened steel may be fitted within the hub shell against which the cylinder bears when expanded.

What I claim is:

1. In a driving and braking mechanism for cycles and the like, a hub-shell, an expansible cylinder within said shell and having a longitudinal split, a rotatable cone at one end of said shell and provided with a notch and having a cone-sleeve attached to its inner face, a slotted clutch sleeve slidable on said cone-sleeve and to which said expansible cylinder is attached, a fixed cone adapted to be engaged by the clutch-control sleeve, a peg on said cone-sleeve and adapted to move said clutch-control sleeve into engagement with the fixed cone on backward movement of the rotatable cone and the cone-sleeve, whereby backward movement of the clutch-control sleeve and said cylinder is prevented, and a control lever disposed in said split and having one end received by said notch of the rotatable cone.

2. In a driving and braking mechanism for cycles and the like, a hub-shell, an expansible cylinder in said hub-shell and having a split therein, a longitudinally displaceable clutch-sleeve mounted within the cylinder, and fixed thereto, a lever disposed in the split of the cylinder for expanding the cylinder, means for operating said lever, means for displacing the clutch-sleeve longitudinally, and means engageable by the clutch sleeve for preventing backward rotation thereof and of the expansible cylinder attached thereto when the clutch sleeve is longitudinally displaced.

3. In a driving and braking mechanism for cycles and the like, the combination of a hub-shell, an expansible cylinder within said hub and having a longitudinal split, a lever within said split for expanding the cylinder, said lever being longitudinally disposed relatively to said cylinder, a non-rotatable and longitudinally movable clutch sleeve carrying said lever, a clutch adapted to be engaged by said clutch sleeve on the longitudinal movement of the clutch sleeve, means for moving said sleeve into engagement with the clutch when back-pedaling and to disengage it when driving, and means for actuating said lever.

4. In driving and braking mechanism for cycles and the like, the combination of a hub-shell, a longitudinally split cylinder located within said hub-shell, a lever for expanding said cylinder, said lever being longitudinally disposed relatively to the said cylinder, a longitudinally movable sleeve carrying said lever, a clutch on the end of the said sleeve, a fixed cone located in the end of the hub-shell, a clutch on said cone, means for causing said clutches to engage on back-pedaling and disengage when driving, a sprocket wheel, and means for mutually engaging the sprocket wheel and the lever, substantially as set forth.

5. In driving and braking mechanism for cycles and the like, the combination of a hub-shell, an expansible cylinder located within said hub-shell and provided with a longitudinal split, a lever for expanding said cylinder, said lever being disposed in said split longitudinally relatively to the said cylinder, a longitudinally movable control sleeve carrying said lever and attached to said cylinder, a clutch on the end of said sleeve, a fixed cone located in the end of the hub-shell, a clutch on said cone, said control sleeve being provided with an inclined slot, a rotatable cone engaging the aforesaid lever, a cone-sleeve fixed to the rotatable cone, and a peg attached to the cone sleeve and working in said slot for longitudinally moving said control sleeve to cause said clutches to engage each other in back-pedaling and disengage when driving, a sprocket wheel secured to said rotatable cone, and means for connecting the rotatable cone to the lever in such a manner as to cause the lever to be actuated from the sprocket wheel, substantially as set forth.

6. In driving and braking mechanism for cycles and the like, the combination of a hub-shell, a longitudinally split cylinder located within said hub-shell, a lever longitudinally disposed relatively to the said cylinder and adapted to expand said cylinder, a longitudinally movable control sleeve, a fixed cone located in the end of the hub-shell, a clutch on said cone, a clutch on the end of the control sleeve, an inclined slot in said control sleeve, a rotatable cone provided with a notch engaging the aforesaid lever, for expanding the cylinder, and a peg movable by said rotatable cone and engaging said control sleeve for causing longitudinal movement of the control sleeve to cause said clutches to engage each other in back-pedaling and to disengage when driving, a sprocket wheel secured to said rotating cone, whereby the lever is actuated from the sprocket cone, and a spring for normally retaining the lever ready for driving, substantially as set forth.

7. In a back-pedaling coaster brake, the combination with a supporting shaft, of a wheel hub, a driver therefor, a brake anchor provided with a clutch element, a brake member normally disconnected from the anchor, comprising an expansible split ring, a clutch element to engage the anchor, and a lever that extends from the driver into the expansible ring, separated shoulders on the driver that engage the lever on forward driving and back-pedaling, respectively, to expand the brake ring; and means carried by the driver and adapted on back pedaling to engage the brake member to move its clutch element longitudinally in the direction of the anchor, substantially as shown and described.

8. In a back-pedaling coaster brake, the combination with a supporting shaft, of a wheel hub, a driver therefor, a brake anchor provided with a clutch element, a brake member normally disconnected from the anchor, comprising an expansible split ring, a clutch element to engage the anchor, and a lever that extends from the driver into the brake member, means whereby the lever is operatively engaged by the driver on forward driving and back-pedaling, respectively, to expand the expansible ring, and a cam surface on the driver adapted on back-pedaling to engage the brake element to move its clutch element longitudinally in the direction of the anchor, substantially as shown and described.

9. In a back-pedaling coaster brake, the combination with a supporting shaft, of a wheel hub, a driver therefor, a brake anchor provided with a clutch element, a lever projecting inwardly from the driver and adapted to enter an expansible split ring, a brake member comprising a clutch element to engage the anchor and an expansible ring split longitudinally, containing the lever in the slot thus formed, and cut away to afford a medial bearing for said lever, means carried by the driver and adapted on back-pedaling to move the clutch element of the brake member longitudinally in the direction of the anchor; and means whereby the lever is operatively engaged by the driver on forward driving and back-pedaling, respectively, substantially as shown and described.

10. In driving and braking mechanism for cycles and the like, the combination of a hub-shell, a longitudinally split cylinder located within said hub-shell, a lever for expanding said cylinder, said lever being longitudinally disposed relatively to the said cylinder, a longitudinally movable sleeve carrying said lever, a clutch on the end of the said sleeve, a fixed cone located in the end of the hub-shell, a clutch on said cone, means for causing said clutches to engage on back-pedaling and disengage when driving, a sprocket wheel, and means whereby the sprocket wheel actuates the lever, substantially as set forth.

11. In a driving and braking mechanism for cycles and the like, the combination of a spindle, a rotatable cone thereon and provided with a notch, a sprocket-wheel secured to the rotatable cone, an inner cone-sleeve rotatable on said spindle and rigidly secured to said rotatable cone, a clutch control sleeve slidably mounted on said inner sleeve and having a transversely disposed slot near the end toward said rotatable cone, the opposite end being provided with teeth, a fixed cone having teeth adapted to be engaged by the teeth of said clutch-control sleeve, a peg carried by said inner sleeve and adapted to engage in said slot to move said clutch-control sleeve into engagement with said fixed cone when said rotatable cone is rotated backwardly whereby further backward rotation of the clutch-control sleeve is prevented, an expansible cylinder disposed around said clutch-control sleeve and having a longitudinal split therein, a stop holding said expansible cylinder in normal relation to said clutch-control sleeve, a control lever disposed in said split and having one end received by said notch of the rotatable cone.

In testimony whereof, I have signed my name to this specification in the presence of two subscribing witnesses.

ROBERT WALKER.

Witnesses:
 HAROLD J. C. FORESTER,
 NEVILL W. BRITTON.